Patented Nov. 24, 1925.

1,562,624

UNITED STATES PATENT OFFICE.

ALFRED I. DUPREY, OF EUREKA, CALIFORNIA.

PROCESS FOR MAKING SOLES FOR SHOES.

No Drawing.   Application filed December 16, 1924.   Serial No. 756,364.

*To all whom it may concern:*

Be it known that I, ALFRED I. DUPREY, a citizen of the United States, residing at Eureka, in the county of Humboldt and State of California, have invented a new and useful Process for Making Soles for Shoes, of which the following is a specification.

This invention relates to a process for making shoe soles and the object thereof is to so construct a sole of this character which is light and elastic and very durable.

The process of making a shoe sole in accordance with this invention consists in taking sole leather tanned in the usual manner and scouring it to remove therefrom any uncombined tannin and any other extraneous matter. The so scoured leather is then stretched on frames and dried in order that the sides will be as flat as possible when dried. After so treating the leather the sides are cut into soles, the heavier parts being used for men's soles and the lighter parts for women's and children's.

The cut soles are immersed in warm water to expand the fiber of the leather and are packed into boxes while wet to allow the moisture to be evenly distributed throughout the leather. These wet soles are then placed into a drum which may be heated and which may be connected with a vacuum pump and condenser also with an inlet for introducing the solution to be drummed into the leather. The solution used is prepared by treating washed and masticated rubber with carbon tetrachloride, the moistened soles are introduced into the drum which has previously been heated to about 140° F. and a portion of the rubber solution is run into the drum while it is revolving at about 15 R. P. M. When the solution so entered has been drummed into the leather the vacuum pump is started and the carbon tetrachloride or solvent withdrawn from the drum and condensed for further use as a solvent. More rubber solution is then introduced and drummed into the leather as before and this operation is repeated until no more solution will be taken up by the leather. The so rubberized leather is then withdrawn and introduced into another drum which is constructed to withstand the action of sulphur monochloride and sufficient 2% solution of sulphur monochloride is introduced into the drum to vulcanize the rubber contained in the sole. If there is moisture in the leather, part of the chlorine will combine with the moisture and form hydrogen chloride. The so treated soles are then withdrawn and tested for hydrochloric acid which if found is neutralized by the addition of sufficient ammonia or any suitable mild alkali. They are then washed with pure water, dried and sorted ready for use.

I claim:—

1. A process of making shoe soles which consists in cutting soles from thoroughly tanned leather from which all uncombined tannin and extraneous matter has been removed; then immersing the so cut soles in hot water to expand the fiber of the leather and packing the wet soles in boxes to allow the moisture to be evenly distributed throughout them, then subjecting the wet soles to a solution of rubber in the presence of heat and under vacuum, then subjecting the so rubberized soles to the action of a 2% solution of sulphur monochloride, then withdrawing and drying the soles and finally washing and drying the soles.

2. A process of making shoe soles which consists in cutting soles from thoroughly tanned leather from which all uncombined tannin and extraneous matter has been removed; then immersing the so cut soles in hot water to expand the fiber of the leather and packing the wet soles in boxes to allow the moisture to be evenly distributed throughout them, then subjecting the wet soles to a solution of rubber in the presence of heat and under vacuum; then repeating the rubberizing treatment until no more solution will be taken up by the leather, then subjecting the rubberized soles to a vulcanizing treatment; and then washing and drying them ready for use.

3. A process of making shoe soles which consists in taking firmly tanned leather and cutting the soles therefrom, then subjecting the soles so cut to hot water to expand the fiber of the leather, then treating the soles to evenly distribute the moisture throughout the leather, then placing the soles in a heated drum connected with a vacuum pump and a condenser and with an inlet for introducing a solution to the drum, admitting a prepared rubber solution to the drum and revolving the drum until the solution is entirely taken up, repeating the rubberizing treatment until no more solution will be taken into the leather, then subjecting the leather to a vulcanizing solution, then withdrawing the soles and drying them and then washing the soles and drying them ready for use.

In testimony that I claim the foregoing as my own, I have hereto affixed my signature.

ALFRED I. DUPREY.